(12) United States Patent
Roberts

(10) Patent No.: US 9,086,109 B2
(45) Date of Patent: Jul. 21, 2015

(54) ADJUSTER SYSTEM

(71) Applicant: MERITOR HEAVY VEHICLE BRAKING SYSTEMS (UK) LIMITED, Cwmbran, Gwent (GB)

(72) Inventor: Paul Roberts, Gwent (GB)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 131 days.

(21) Appl. No.: 13/692,311

(22) Filed: Dec. 3, 2012

(65) Prior Publication Data

US 2013/0140114 A1    Jun. 6, 2013

(30) Foreign Application Priority Data

Dec. 5, 2011 (EP) .................................. 11191996
Oct. 4, 2012 (EP) .................................. 12187188

(51) Int. Cl.
*F16D 65/40* (2006.01)
*F16D 55/2255* (2006.01)
*F16D 65/00* (2006.01)
*F16D 65/52* (2006.01)

(52) U.S. Cl.
CPC ............ *F16D 65/40* (2013.01); *F16D 55/2255* (2013.01); *F16D 65/0043* (2013.01); *F16D 65/52* (2013.01)

(58) Field of Classification Search
USPC ............... 188/73.32, 73.31, 72.1, 72.3, 72.7, 188/72.8, 73.1, 73.44, 73.45
See application file for complete search history.

(56) References Cited

U.S. PATENT DOCUMENTS

| 6,820,727 | B1 * | 11/2004 | Theiss et al. ............... 188/73.32 |
| 8,668,419 | B2 * | 3/2014 | Hardt et al. ...................... 411/5 |
| 2006/0144652 | A1 * | 7/2006 | Wimmer et al. ........... 188/73.38 |

FOREIGN PATENT DOCUMENTS

| DE | 19923457 C1 | 11/2000 |
| DE | 102005019602 A1 | 12/2005 |
| EP | 0730107 A2 | 9/1996 |
| EP | 1596092 A1 | 11/2005 |
| EP | 2055981 A2 | 5/2009 |
| WO | WO 2010017901 A1 * | 2/2010 |

OTHER PUBLICATIONS

European Patent Office, Extended European Search Report for corresponding European Patent Application No. 12187188.3 mailed Mar. 20, 2013.

* cited by examiner

*Primary Examiner* — Melanie Torres Williams
(74) *Attorney, Agent, or Firm* — Brooks Kushman P.C.

(57) ABSTRACT

An adjuster system for adjusting the position of a brake pad relative to a brake disc so as to maintain a suitable running clearance between the pad and disc in a disc brake. The system comprises a manual rewind apparatus to reset the position of the brake pad when replacement thereof is required. The manual rewind apparatus has a transmission path extending from a rewind tool engaging portion to a brake pad engaging portion of the system. The manual rewind apparatus is configured such that when a rewind torque above a pre-determined torque is applied to the transmission path by a rewind tool no damage is caused to components along the transmission path.

19 Claims, 7 Drawing Sheets

ADJUSTER SYSTEM

TECHNICAL FIELD

This invention relates to an adjuster system for adjusting the position of a brake pad relative to a brake disc.

BACKGROUND

Many brakes, for use on a vehicle, have an adjuster mechanism to set the position of friction elements to account for wear thereof. Generally, the adjuster mechanism has an adjuster shaft of which an end portion is accessible from the exterior of a brake housing and operable to manually re-wind or de-adjust the adjuster to permit removal and replacement of brake friction elements (commonly known as brake pads) and/or other servicing procedures. In conventional adjuster mechanisms having such a de-adjustment facility, there is a danger of excessive manual de-adjustment of the mechanism leading to locking together, shearing, or other damage to internal components thereof, resulting in the mechanism becoming inoperative in normal use.

An attempt has been made to solve this problem by providing a weakness or rupture in the adjuster shaft of such a mechanism so that shearing takes place at a predetermined excessive torque applied to the shaft in the de-adjustment and adjustment direction. This is disadvantageous in that the sheared shaft has to be replaced, requiring stripping and re-building of the adjuster after each shaft shearing.

An alternative solution is described in GB2304387, which provides a shearable or deformable element engageable with the shaft. The element shears or deforms when a torque above a pre-determined torque is applied (but less than the torque that damages the adjuster mechanism), so as to prevent or reduce further torque application to the shaft. However, this arrangement requires that the element be replaced after the element has deformed or sheared.

SUMMARY

The present invention aims to alleviate at least some of the problems with the prior art.

Accordingly a first aspect of the invention provides an adjuster system for adjusting the position of a brake pad relative to a brake disc so as to maintain a suitable running clearance between the pad and disc in a disc brake, the system comprising:
  a manual rewind apparatus to reset the position of the brake pad when replacement thereof is required,
  the manual rewind apparatus having a transmission path extending from a rewind tool engaging portion to a brake pad engaging portion of the system;
  wherein the manual rewind apparatus is configured such that when a rewind torque above a pre-determined torque is applied (in either direction) to the transmission path by a rewind tool no damage is caused to components along the transmission path.

Advantageously the manual rewind apparatus of the present invention prevents damage to any component of the manual rewind apparatus along the transmission path and to other components of the adjuster system or brake. Currently, components of a disc brake are designed such that they can withstand a manual "abuse" torque which for certain types of disc brakes is approximately 100 Nm. The present invention permits a pre-determined torque to be set such that the level of torque will never reach such a high level. This means that the factor of safety components of the disc brake are manufactured to can be lowered, which in turn reduces the cost of manufacturing a disc brake.

The rewind tool engaging portion of the manual rewind apparatus is a portion of the manual rewind apparatus that engages either a standard or a customised tool. For example the rewind tool engaging portion may be the end of a shaft or it may be an adaptor/cap connected to the shaft.

For the purposes of this application, a tool means a component that is separable and removable from the rewind tool engaging portion of the manual rewind apparatus and has a handle or a powered drive. In this way, the tool is not engaged with the tool engaging portion and is separated therefrom during normal operation of a disc brake. The tool is used to manually rewind the adjuster system and is removed from the rewind tool engaging portion of the manual rewind apparatus when the disc brake is in normal service (i.e. when the disc brake is used during operation of a vehicle).

A standard tool is a tool that has a standard head, for example a hexalobular internal head such as a TORX head. A non-standard tool is a tool having a non-standard head, for example a head similar to a hexalobular internal head such as a TORX head but having seven points to the star shaped pattern instead of six points (as found on a standard TORX head).

In one embodiment, the transmission path comprises a clutch configured to slip at a predetermined torque. The use of a clutch means that applying a torque above the pre-determined torque does not cause damage to any element of the adjuster system (for example gears or splined shafts thereof), this means that there is no need to replace any damaged element of the mechanism after a torque above the pre-determined torque has been applied.

Throughout this application the term clutch is used to refer to a component that is capable of selectively engaging and disengaging a component, such that, for example, if a torque below the pre-determined torque is applied the clutch will be in a state of engagement, and when a torque above the pre-determined torque is applied the clutch will be in a state of disengagement, giving a subsequent reduction of the torque to a torque below the pre-determined torque returning the clutch to a state of engagement.

In one embodiment the tool is fracturable such that when a torque above the predetermined torque is applied to the adjuster apparatus, the tool will fracture, preventing damage to the transmission path.

A second aspect of the present invention provides an adjuster system for adjusting the position of a brake pad relative to a brake disc so as to maintain a suitable running clearance between the pad and disc in a disc brake, the system comprising:
  a manual rewind apparatus to reset the position of the brake pad when replacement thereof is required,
  the manual rewind apparatus having a clutch configured to slip at a predetermined torque, the pre-determined torque being lower than a torque capable of damaging the adjuster apparatus such that excessive rewind torque does not result in damage of the rewind apparatus.

The use of a clutch means that applying a torque above the pre-determined torque does not cause damage to any element of the adjuster system (for example gears or splined shafts thereof), this means that there is no need to replace any element of the mechanism after a torque above the pre-determined torque has been applied.

The following features are optional features of the first or second aspect.

The clutch may operate between two concentrically arranged surfaces. In some embodiments the clutch is a tolerance ring. The use of a tolerance ring provides a convenient option for a clutch that requires minimal additional components to the adjuster system and minimal modification. The tolerance ring may have two open ends that are contactable to form a closed loop. The tolerance ring may have waves, corrugations or bumps formed therein.

The clutch may be located internal to the caliper, i.e. within the caliper. Locating the clutch internal to the caliper instead of on a tool means that the clutch is better protected from damage.

The clutch may be external to the caliper but located on a shaft connected to a mechanism for moving the brake pads, i.e. the clutch does not form part of the tool. In such embodiments, the clutch may be covered by a cap which is gripped by a tool when adjusting the positioning of a brake pad relative to a brake disc.

In some embodiments, the manual rewind apparatus comprises:
- a shaft connected to a mechanism for moving the brake pads; and
- a tool for rotating the shaft;
wherein the clutch is positioned between the tool and the shaft.

For example, the clutch is located on the shaft. Alternatively, the clutch may form part of the tool.

Some disc brakes have a continuous brake pad wear system that indicates to a user when a brake pad needs replacing. The location of the clutch between the tool and the shaft prevents the continuous wear system from potentially becoming unsynchronised when the clutch is in a state of disengagement.

The life of a disc brake can be approximately 20 brake pad changes. As such, even if the torque applied exceeds the pre-determined torque for every brake pad change in the life of the brake, there will usually not be sufficient wear of the clutch to require replacement of the clutch.

A disc brake may have a single piston and other disc brakes may have two or more pistons to drive a brake pad. In the case of disc brakes having two or more pistons, de-adjustment usually requires de-adjustment of all of the pistons. Usually, the manual rewind apparatus directly or indirectly rewinds one of the pistons and a linkage system between the pistons rewinds the other piston(s).

In some embodiments the manual rewind apparatus comprises;
- a shaft connected to a mechanism for moving the brake pads; and
- wherein the clutch is positioned between the shaft and a component of the mechanism for moving the brake pads. In such embodiments the manual rewind apparatus may also comprise a tool.

In a third aspect the present invention provides an adjuster system for adjusting the position of a brake pad relative to a brake disc so as to maintain a suitable running clearance between the pad and disc in a disc brake, the system comprising:
- a manual rewind apparatus to reset the position of the brake pad when replacement thereof is required;
- the manual rewind apparatus having a tool for applying torque to a transmission path of the manual rewind apparatus;
- wherein the tool is configured such that application of a torque above a pre-determined torque causes the tool to fracture, so that no damage is caused to the manual rewind apparatus of the brake pad.

The tool may have a head for turning a component positioned along the transmission path and a handle for turning the tool. A portion of the head may be configured to fracture when a torque above the predetermined torque is applied to the adjuster apparatus.

In some embodiments an attachment between the tool and the transmission path of the manual rewind apparatus is of a non-standard configuration. Advantageously, a non-standard configuration means that only a tool that is configured to have a set pre-determined torque and to fail (fracture/deform) at a specific position can be used to rewind the adjuster mechanism.

In alternative embodiments, an attachment between the tool and the transmission path of the manual rewind apparatus is of a standard configuration.

The tool may have a hexalobular internal head such as a TORX head. The TORX head may be a T30, T35 or a T40 torx head.

The adjuster system of the first, second or third aspect may have a pre-determined torque of 25 to 90 Nm. In other embodiments the pre-determined torque may be 25 to 50 Nm, or 25 to 35 Nm.

In some embodiments, the tool is a pad retainer of the disc brake. For example, the pad retainer may comprise a standard or a non-standard tool head for use as the tool. For example, the head on the pad retainer of the disc brake may be the female portion of the head and shaft interface, or in alternative embodiments the head on the pad retainer may be the male portion. In such embodiments, the pad retainer is removed from the disc brake and is used to adjust or change the position of the brake pads. Once the brake pads are replaced and/or correctly positioned, the pad retainer can be re-attached to the disc brake. This is advantageous because generally the pad retainer needs to be removed to replace or adjust the brake pads, and the dual use of the pad retainer as both the tool and the pad retainer means that the tool is conveniently accessible to the user during a brake pad change/repositioning.

A fourth aspect of the present invention provides a disc brake having an adjuster system of any one of the first, second or third aspects.

DESCRIPTION OF THE DRAWINGS

Embodiments of the present invention will now be described, by way of example only, with reference to the accompanying drawings in which.

DETAILED DESCRIPTION

Figure 7:
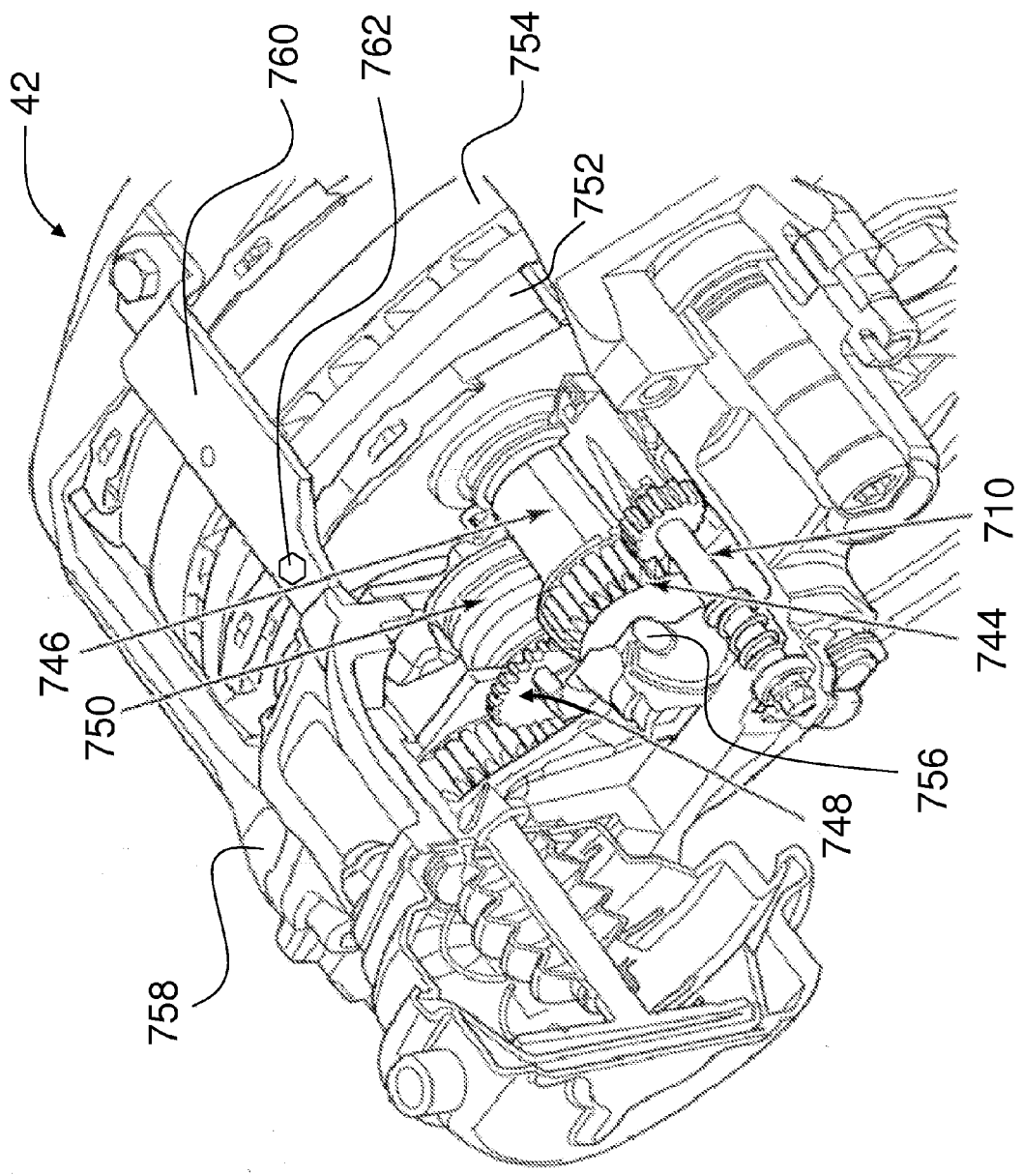
FIG. 7 shows schematically a disc brake assembly having the manual rewind apparatus of any one of FIGS. 1 to 6.

An adjuster system of the present invention can be used on a disc brake, for example the disc brake indicated generally at 42 in FIG. 7. Operation of such disc brakes is well known, but briefly, to apply the brake a force is applied to an operating shaft which pivots about pivot point 756. The pivoting motion of the operating shaft moves one or more pistons 746 towards a brake disc 754. The piston(s) are connected to an inboard brake pad 752 such that axial movement of the pistons 746 axially moves the inboard brake pad 752 towards the brake disc 754. Once the inboard pad 752 contacts the brake disc 754, the force of reaction acting through a housing 758 that houses the pistons pulls the outboard pad on to the brake disc. To release the brake, a return spring 750 returns the pistons and operating shaft back to their "brakes-off" positions, leaving the pads with a running clearance to the brake disc.

The operating shaft is connected to an adjuster system 750 such that when the operating shaft pivots, if adjustment to account for wearing of the friction material is required, the operating shaft rotates the adjuster system. This rotation extends the pistons 746 outboard towards the brake disc 754 so as to move the brake pads 752 towards the brake disc and bring the running clearance back into to desired range.

In some applications an electrical continuous wear sensor (CWS) is fitted (not shown). The CWS monitors the amount of friction material remaining on the pads, in order that users are aware of when the pads need replacing. The CWS is typically linked to gears of the adjuster system that drive extension of the pistons.

When the pads require replacement, a manual rewind apparatus of an adjuster system 750 can be used to move the pistons inboard. A pad retainer 760 that extends across the pads is removed, and the worn pads are removed radially outwardly from the housing with the housing in situ. However, because the replacement pads have a greater thickness of friction material the adjustment mechanism needs to be de-adjusted or rewound to accommodate the new brake pads.

In this disc brake, to de-adjust the adjuster system 750 the shaft 710 of the manual rewind apparatus is turned, this turns gear 744 which in turn retracts the piston 746. A gear 748 connects the piston 746 to a further piston (not shown) and transfers the rewind rotation/retraction to the further piston.

Figure 1:
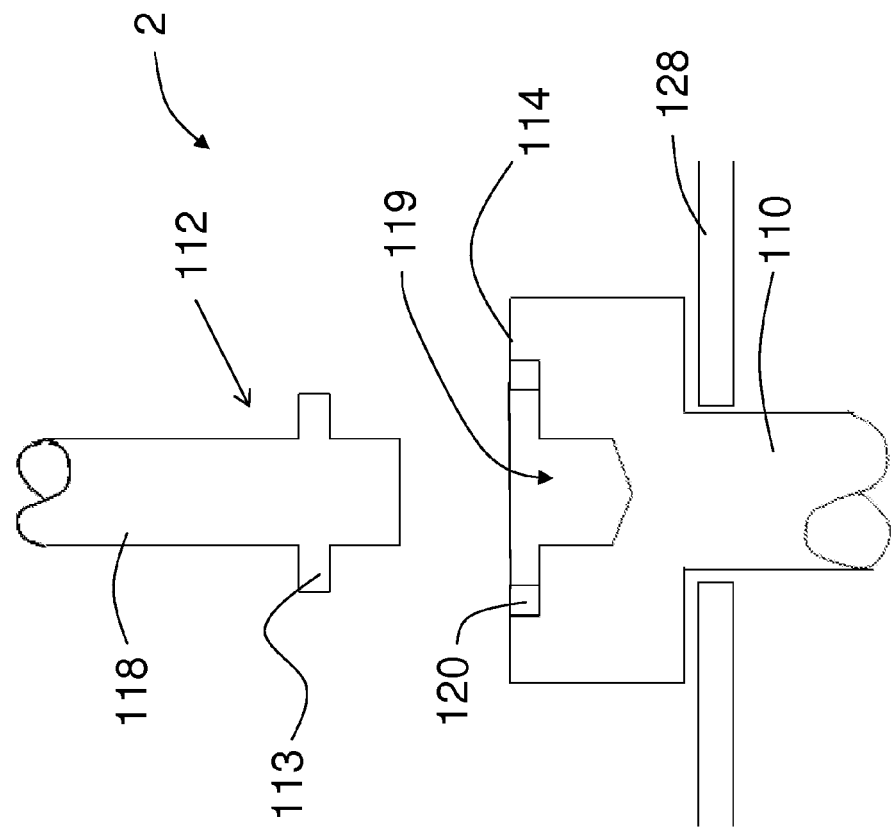
FIG. 1 shows schematically a cross section of a manual rewind apparatus portion of an adjuster system according to a first embodiment of the present invention.

Referring to FIG. 1, a manual rewind apparatus of an adjuster system according to a first embodiment of the present invention is indicated generally at 2. In this embodiment the manual rewind apparatus 2 comprises a rewind shaft 110 connected to a mechanism for moving the brake pads of a disc brake and a tool 112 for rotating the shaft 110.

An inner most end (lowermost end in FIG. 1) of the shaft 110 further extends into cooperative relationship with components of the adjuster system (not shown). The innermost end of the shaft 110 is positioned within a housing (not shown, but a wall of which is indicated at 128) of a disc brake.

The outermost end 114 (uppermost in FIG. 1) of the shaft protrudes from the housing of the disc brake and is dimensioned to receive the tool 112. In this embodiment, the shaft has a cylindrical cross-section and has a greater diameter at the outermost end than at the innermost end. A recess 119 for receiving the tool 112 is formed in the outermost end of the shaft 110. In this embodiment, the recess 119 has a stepped profile, such that the diameter of the recess 119 towards the outermost end is greater than the diameter of the recess at an end towards the innermost end. It will be appreciated by the person skilled in the art that the recess may not be profiled, or the recess may have an alternative suitable profile.

The tool 112 comprises a handle 118 which a user can use to turn the tool 112. In some cases, an automated power tool may be used to turn the handle 118, in other cases the handle may be turned manually, with or without the aid of an additional tool, for example a spanner or wrench. In this embodiment, the tool 112 has a collar 113, formed such that an end of the tool and the collar match the shape of the recess 119. In other embodiments the tool 112 may not have a collar 113.

A clutch, in this case a tolerance ring 120 is located in the recess 119 of the shaft 110. In this embodiment the clutch is located on the largest diameter step of the recess, but it may alternatively be located anywhere on or in the recess in a position where the tolerance ring 120 can engage the tool 112. In embodiments where the tolerance ring is not positioned on a step formed within the shaft, a back up ring may be used to support the tolerance ring and prevent the tolerance ring from sliding. Positioning the tolerance ring 120 on the step having the largest diameter means that when the tool 112 engages the shaft 110, the tolerance ring 120 is positioned around the collar 113 of the shaft 110.

The tolerance ring 120 may be a tolerance ring of any suitable type commonly available, for example an AN or a BN tolerance ring supplied by USA Tolerance Rings of Pennington, N.J., United States of America. In this embodiment the tolerance ring 120 is made from a thin steel strip into which waves, corrugations or bumps are formed. The thin steel strip is curled into a ring shape. Depending on the chosen tolerance ring the waves, corrugations or bumps will face either inwards or outwards. When a torque is applied, the waves deflect. At a torque above a pre-determined torque, the deflection of the waves is such that sliding may occur. Depending on whether the waves are on an inner or outer surface of the tolerance ring determines whether the ring slides with respect to the tool or the shaft, preventing the transmission to the shaft of torque that would cause damage to the adjuster system. Suitable ridges or other forms (not shown) may be provided on the circumferential surface of the tool and/or shaft to interact with the tolerance ring 120 and achieve the desired slippage torque.

To manually operate the manual rewind apparatus 2 so as to move a brake pad away from a brake disc, the tool 112 is engaged with the shaft 110, such that the collar 113 of the tool 112 is engaged with the tolerance ring 120. The tool 112 is then turned, which in turn, turns the shaft 110. Once the shaft 110 is turned to the full extent of de-adjustment (or adjustment), further turning of the tool 112 may result in a torque above a pre-determined torque being applied to the tool. If the torque applied to the tool 112 is greater than the pre-determined torque, the tolerance ring 120 will slip. This slipping of the tolerance ring limits the torque that can be applied to the shaft 110 and therefore prevents damage of the components of the adjuster system. Once the torque applied to the tool 112 is reduced to below the pre-determined torque the tolerance ring 120 will no longer slip and will again move with the tool 112 and the shaft 110.

The torque required to damage a conventional adjuster system of the type conventionally provided in the type of disc brake illustrated in FIG. 7 is approximately 100 Nm. This level of strength is typically selected to provide a safety factor to reduce the risk of damage in "abuse" situations, but disadvantageously results in increased weight and material usage in the brake. Typically, the maximum torque required to turn the shaft 110 is approximately 18 Nm for de-adjustment and 5 Nm for adjustment. Accordingly, the pre-determined torque for a conventional adjuster system of the type having an abuse torque of approximately 100 Nm, and adapted to be an adjuster system of the present invention, should be between 25 and 100 Nm. A preferred pre-determined torque is between 45 and 55 Nm, with 50 Nm being the most preferred pre-determined torque. However, the use of a clutch (e.g. tolerance ring 120) means that the factor of safety to which the adjuster parts are manufactured to can be reduced. For example, the components could be formed so that a torque above 50 Nm causes damage. In such a case the preferred pre-determined torque would be in the range of 25 to 45 Nm, and more preferably 30 Nm. Reducing the factor of safety advantageously means that the components of the adjuster system can be manufactured at a lower cost.

The life of a disc brake can be approximately 20 brake pad changes. As such, even if the torque applied exceeds the pre-determined torque for every brake pad change in the life of the disc brake, there will usually not be sufficient wear of the tolerance ring to require replacement of the tolerance ring.

Advantageously the use of a clutch (e.g. a tolerance ring) protects the components of the adjuster system or other components of the disc brake from damage due to application of too high a torque. A further advantage of the embodiment shown in FIGS. 1 (and FIGS. 2, 3 and 5) is that the arrangement is such that a torque greater than the pre-determined torque is not applied to the shaft 110, which reduces the possibility of the continuous wear system becoming unsynchronised.

Figure 2:
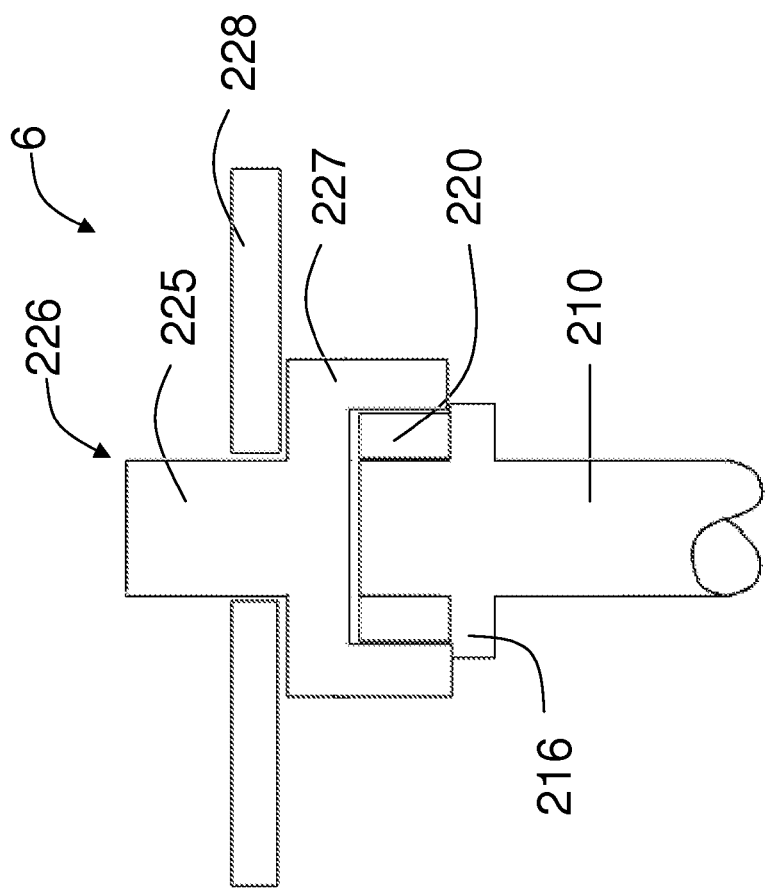
FIG. 2 shows schematically a cross section of a manual rewind apparatus portion of an adjuster system according to a second embodiment of the present invention.

A second embodiment of the present invention is shown in FIG. 2 and a manual rewind apparatus of an adjuster system of a second embodiment is indicated generally at 6. The manual rewind apparatus 6 has a shaft 210 that has a cylindrical cross-section and a collar portion 216. An innermost end of the shaft 210 extends into cooperative relationship with components of the adjuster system. An outermost end of the shaft 210 is connected to a connector 226. The shaft 210 is positioned within the housing of the disc brake. The connector 226 has a main body 225 which protrudes from the housing and can be manually turned with an appropriate tool. Extending from the main body 225 is a mouth 227 that fits over the upper end of the shaft 210, and is located within the housing defined by a wall 228. Located between the mouth 227 and the shaft 210 is a tolerance ring 220.

Figure 3:
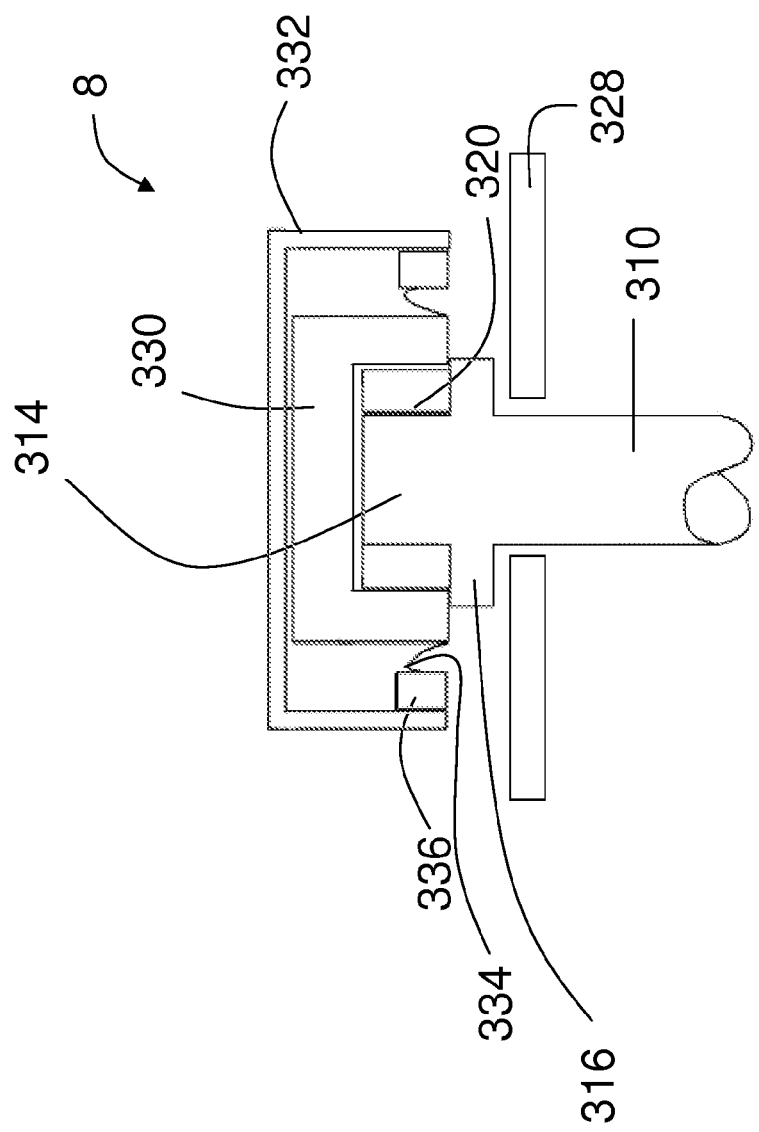
FIG. 3 shows schematically a cross section of a manual rewind apparatus portion of an adjuster system according to a third embodiment of the present invention.

Referring to FIG. 3, a manual rewind apparatus of an adjuster assembly according to a third embodiment is indicated generally at 8. As with the manual rewind apparatus 2 and 6 of the previously described embodiments, the manual rewind apparatus 8 of the third embodiment has a shaft 310 of similar configuration to that of the shaft 210 of the embodiment shown in FIG. 2, in that it is cylindrical with a collar portion 316, and an innermost end extends into cooperative relationship with components of the adjuster system.

An outermost end 314 of the shaft 310 protrudes from the housing (a wall of which is indicated at 328) of the disc brake and is covered by a cap 330. The cap 330 can be turned by an appropriate tool, e.g. a standard spanner/wrench (not shown). A tolerance ring 320 is seated on the collar portion 316 of the shaft 310 such that it surrounds the shaft 310 and is positioned between the shaft 310 and the cap 330. When not in use a protective cover 332 is positioned over the cap 330. The cover 332 being selectively attached to the cap 330 by a spring-loaded mechanism comprising a spring 334 and a connector element 336. The connector element 336 being attached to the cover, and the spring 334 being attached to the cap 330. In an alternative embodiment, the cap and spring-loaded mechanism may be replaced with a rubber self energised cap, or any other suitable sprung cap.

In use, the cover 332 is removed. A torque is then applied to the cap 330. When this torque is below a pre-determined level, the cap 330, shaft 310 and tolerance ring 320 will not move substantially relative to each other, such that rotation of the cap rotates the tolerance ring 320 and therefore the shaft 310. When the torque is greater than the pre-determined torque, the tolerance ring 320 will slip, such that torque above that which would cause damage to the adjuster system is not transferred to the shaft 310 and therefore is not transferred to the adjuster system.

Figure 4:
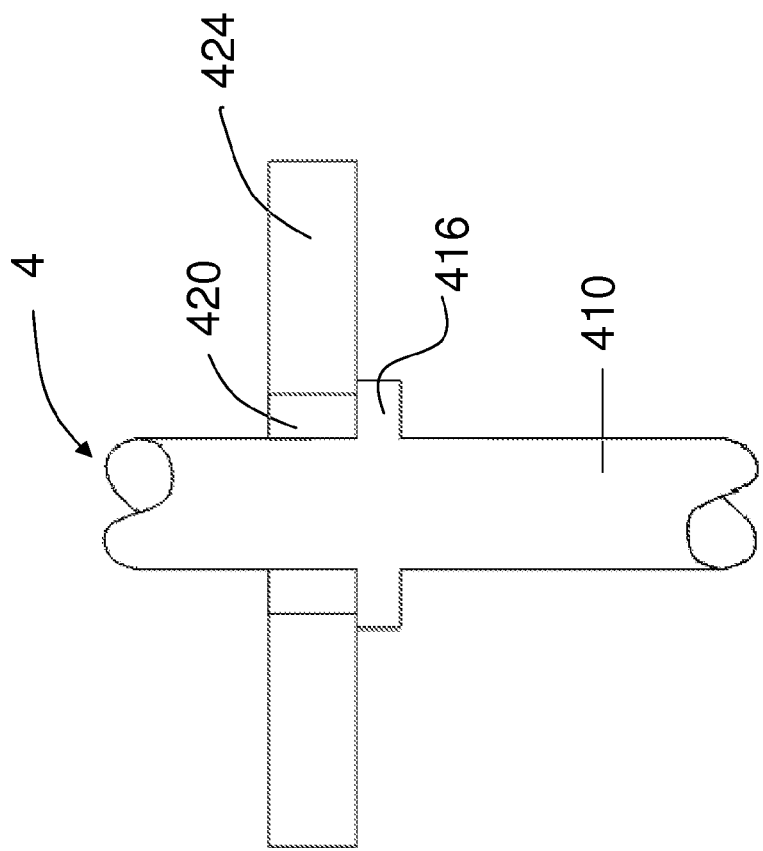
FIG. 4 shows schematically a cross section of a manual rewind apparatus portion of an adjuster system according to a fourth embodiment of the present invention.

An alternative embodiment of the adjuster system having a manual rewind apparatus is indicated generally at 4 in FIG. 4. In this embodiment, the shaft 410 is cylindrical and a collar portion 416 is provided on the shaft 410 at a location within the housing of the disc brake. An outermost end of the shaft 410 is engageable with a tool and an innermost end extends into cooperative relationship with components of the adjuster system.

The tolerance ring 420 is positioned around the shaft 410 and is seated on the collar portion 416. In other embodiments there may be no collar portion 416, in which case, a back-up ring, for example a cir-clip may be used during assembly of the adjuster system or permanently positioned to locate the tolerance ring 420. The tolerance ring 420 is positioned between the shaft 10 and a component of the adjuster system 424. The component of the adjuster system may be any component that is part of the mechanism that transforms the rotational motion of the shaft to linear motion of the brake pads. In this embodiment, component 424 is a gear, but in other embodiments it may be the inner surface of a piston that acts on a brake pad.

Figure 5:
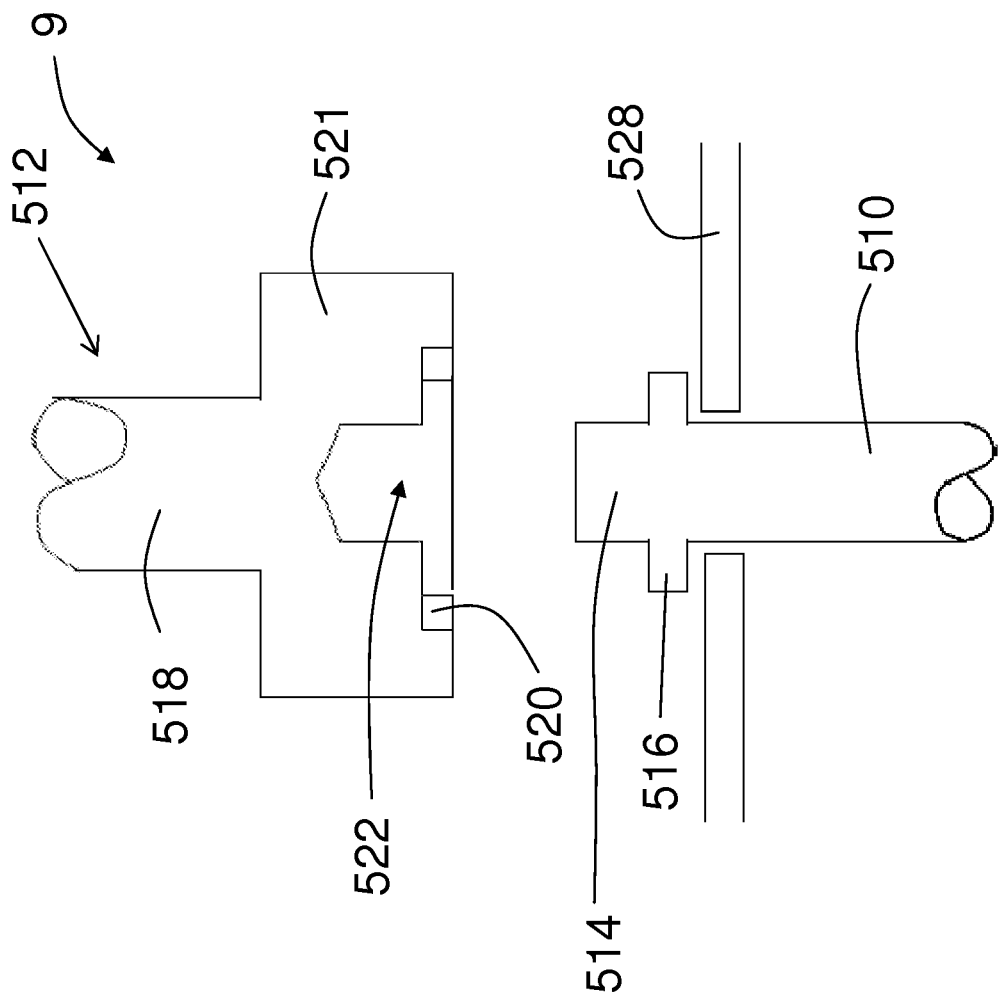
FIG. 5 shows schematically a cross section of a manual rewind apparatus portion of an adjuster system according to a fifth embodiment of the present invention.

Referring to FIG. 5, a manual rewind apparatus of an adjuster system according to a fifth embodiment of the present invention is indicated generally at 9. In this embodiment the manual rewind apparatus 9 comprises a shaft 510 and a tool 512 for rotating the shaft 510. An innermost end of the shaft 510 extends into cooperative relationship with components of the adjuster system. An outermost end 514 of the shaft is dimensioned to receive the tool. In this example the upper end is cylindrical. The shaft 510 may be profiled in the longitudinal axis, for example, it may have a collar portion 516 located below the outermost end 514 of the shaft 510 and outside a wall 528 of the housing in a position that is engagable with the tool 512.

The tool 512 comprises a handle 518 which a user can use to turn the tool 512. In some cases, a suitable drive formation (e.g. a square interface) for a power tool, spanner or wrench may be provided on the tool in place of a handle. The drive formation for the purposes of this application is considered to be a handle. In this example, the tool has a body 521 of larger diameter than the handle 518 and is adjoined to and positioned below the handle 518. A recess 522 is formed in the body 521 of the tool 512 to receive the upper end of the shaft 510. A tolerance ring 520 is located in the recess 522 of the tool 512. In this example, the tolerance ring 520 is positioned such that when the tool 512 engages the shaft 510, the tolerance ring is positioned around the collar portion 516 of the shaft 510. It will be appreciated that the tolerance ring could be positioned anywhere in the recess, in a position suitable to engage the shaft 510.

Figure 6:
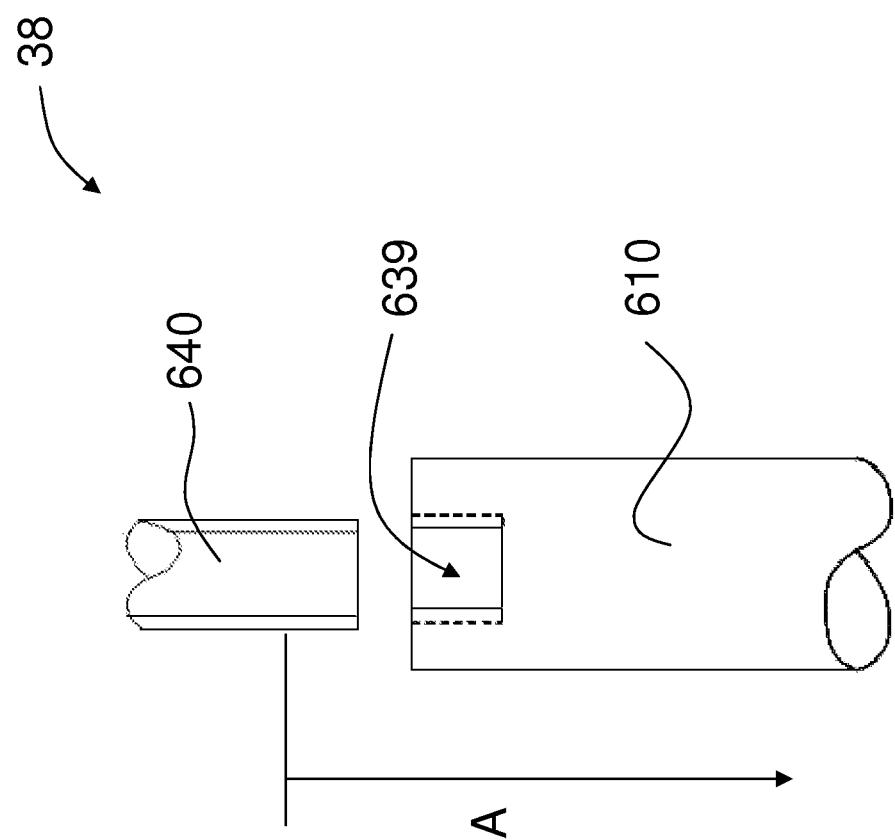
FIG. 6 shows schematically a cross section of a manual rewind apparatus portion of an adjuster system according to a sixth embodiment of the present invention.

Yet a further embodiment of the present invention is shown in FIG. 6 and a manual rewind apparatus thereof is indicted generally at 38. In this embodiment, a shaft 610 is provided, the innermost end of which extends into cooperative relationship with components of the adjuster system. The shaft 610 has a cylindrical cross-section and an outermost end of the shaft 610 protrudes from the housing of the disc brake so that it can be accessed by a user so as to manually de-adjust the adjuster system.

A recess 639 is provided in the outermost of the end of the shaft 610 and configured so as to receive a tool 640. The recess 639 may be shaped to receive a torx screwdriver, allen key, or the like. Alternatively the recess 639 may have a profile that will not receive a tool of standard dimensions, for example it may be similar to a hexalobular internal configuration such as a TORX connection but may have more or fewer points than the standard six point TORX head. Tool 640 is profiled so as to match the configuration of the recess 639 in shaft 610. In this embodiment, the transmission path 644 of the manual rewind apparatus extends from the portion of the shaft engaging the tool to the opposite end of the shaft.

In an embodiment where the recess 639 is configured to receive a standard tool, the recess is shaped so as to receive a selected standard tool that would inevitably fail at a torque lower than that which would cause damage to the adjuster system, but permits a torque great enough to rewind the rewind apparatus to be turned. For example, the recess may be configured to receive a standard hexalobular internal head such as a TORX head, and at a pre-determined torque below that which would damage the adjuster system, one or more of the lobes on the hexalobular internal head or TORX head tool will fail (eg: shear or fracture). It is expected that a T35 or a T40 TORX head or thereabouts would provide an appropriate level of strength, but in some embodiments the TORX head may be smaller, for example a T30 TORX head.

In an alternative embodiment, where the tool 640 is of non-standard configuration, the head may be configured to break at a pre-determined torque. A non-standard configuration advantageously permits more flexibility in the selection of the pre-determined torque, whereas the use of a standard tool is advantageous because replacement tools are readily available.

To manually operate the manual rewind apparatus 38 so as to move a brake pad away from a brake disc, the tool 640 is engaged with the recess 639 of the shaft 610. The tool 640 is then turned, which in turn, turns the shaft 610. Once the shaft 610 is turned to the full extent of de-adjustment, further turning of the tool 640 may result in a torque above a pre-determined torque being applied to the tool 640. If the torque applied to the tool 640 is greater than the pre-determined torque, the tool 640 will fracture. This prevents further torque being applied to the shaft using tool 640, thus the transmission path 644 of the adjuster system is protected from damage.

In alternative embodiments, the recess 639 may be configured to receive any other suitable type of tool head, for example a slot, philips, pozidriv, square, hex, tri-wing, torq-set, triple square, polydrive, one-way, spline drive, double hex, bristol or pentalobular head.

In the above described embodiments, the tool may be the pad retainer 760 of the disc brake 42 (shown in FIG. 7). In such embodiments, the pad retainer comprises either a standard or non-standard tool head (shaft engaging portion). The head may be for example a recess 762 formed in the pad retainer. In alternative embodiments the head may protrude from the pad retainer. The pad retainer 760 may be used as a handle of the tool.

Although the invention has been described above with reference to preferred embodiments, it will be appreciated that various changes or modifications may be made without departing from the scope of the invention as defined in the appended claims.

What is claimed is:

1. An adjuster system for adjusting a position of a brake pad relative to a brake disc so as to maintain a suitable running clearance between the brake pad and brake disc in a disc brake, the system comprising:
   a manual rewind apparatus to reset the position of the brake pad when replacement thereof is required, the manual rewind apparatus including:
      a rewind shaft, the rewind shaft having an end, the end comprising a tool engaging portion; and
      a tool to apply a torque to a transmission path of the manual rewind apparatus, the tool having a head for engaging the tool engaging portion and a selected one of a handle and a powered drive for applying a suitable torque to turn the tool;
   wherein the tool is configured such that application of a torque above a predetermined torque causes the tool to fail, so that no damage is caused to the manual rewind apparatus of the brake pad; and
   wherein the tool is a wrench that is disengaged from the manual rewind apparatus when torque is not applied to the transmission path and the tool engaging portion is shaped such that the head of the tool received therein will fail at a torque lower than that which would cause damage to the adjuster system but permit a torque great enough to rewind the manual rewind apparatus.

2. The adjuster system according to claim 1, wherein a component of a portion of the tool engaging the manual rewind apparatus is configured to fail when a torque above the predetermined torque is applied to the manual rewind apparatus.

3. The adjuster system according to claim 1, wherein an attachment between the tool and the transmission path of the manual rewind apparatus is of a non-standard configuration.

4. The adjuster system according to claim 1, wherein an attachment between the tool and the transmission path of the manual rewind apparatus is of a standard configuration.

5. The adjuster system according to claim 4, wherein the tool comprises a hexalobular internal head and the hexalobular internal head is configured to fail when a torque above the predetermined torque is applied to the manual rewind apparatus.

6. The adjuster system according to claim 1 wherein the tool is a pad retainer of the disc brake.

7. The adjuster system according to claim 1 wherein the tool engaging portion is a recess.

8. The adjuster system of claim 1 wherein the predetermined torque is in a range of 25 to 90 Nm.

9. The adjuster system of claim 8 wherein the predetermined torque is in the range of 25 to 50 Nm.

10. The adjuster system of claim 9 wherein the predetermined torque is in the range of 25 to 36 Nm.

11. The adjuster system of claim 1 wherein the tool is configured to be separated from the tool engaging portion during normal operation of the disc brake.

12. An adjuster system for adjusting a position of a brake pad relative to a brake disc so as to maintain a suitable running clearance between the brake pad and brake disc in a disc brake, the system comprising:
   a manual rewind apparatus to reset the position of the brake pad when replacement thereof is required,
   the manual rewind apparatus having a clutch positioned along a transmission path that extends from a rewind tool engaging portion to a brake pad engaging portion of the adjuster system, the clutch being configured to slip at a predetermined torque, the predetermined torque being lower than a torque capable of damaging the manual rewind apparatus such that excessive rewind torque does not result in damage of the manual rewind apparatus;

wherein the clutch operates between two concentrically arranged surfaces, and wherein the clutch is a tolerance ring.

13. The adjuster system according to claim 12, wherein the tolerance ring has two open ends that are contactable to form a closed loop and/or the tolerance ring has waves, corrugations or bumps formed therein.

14. The adjuster system according to claim 12, wherein the manual rewind apparatus comprises:

a shaft connected to a mechanism for moving the brake pad; and a tool for rotating the shaft;

wherein the clutch is positioned between the tool and the shaft.

15. The adjuster system according to claim 14, wherein the clutch is located on the shaft.

16. The adjuster system according to claim 12, wherein the manual rewind apparatus comprises:

a shaft connected to a mechanism for moving the brake pad; and wherein the clutch is positioned between the shaft and a component of the mechanism for moving the brake pad.

17. The adjuster system according to claim 12, wherein the clutch is located internal to a caliper.

18. The adjuster system of claim 14 wherein the tool is a wrench.

19. A disc brake assembly including a brake and an adjuster system, the adjuster system for adjusting a position of a brake pad relative to a brake disc so as to maintain a suitable running clearance between the brake pad and brake disc in a disc brake, the system comprising:

a manual rewind apparatus to reset the position of the brake pad when replacement thereof is required;

the manual rewind apparatus having a rewind shaft, the rewind shaft having an end, the end comprising a tool engaging portion, a tool to apply torque to a transmission path of the manual rewind apparatus, the tool having a head for engaging the tool engaging portion and a selected one of a handle and a powered drive for applying a suitable torque to turn the tool;

wherein the tool is configured such that application of a torque above a pre-determined torque causes the tool to fail, so that no damage is caused to the manual rewind apparatus; and wherein the tool is a wrench that is disengaged from the manual rewind apparatus when torque is not applied to the transmission path and the tool engaging portion is shaped such that the head of the tool received therein will fail at a lower torque than that which would cause damage to the adjuster system but permit a torque great enough to rewind the manual rewind apparatus.

* * * * *